United States Patent
North et al.

(10) Patent No.: US 7,274,557 B2
(45) Date of Patent: Sep. 25, 2007

(54) APPARATUS FOR MOUNTING A DISPLAY SYSTEM TO A FRONT SIDE OF A SURFACE

(75) Inventors: Ken North, San Carlos, CA (US); Jeffrey Thomas Haller, South San Francisco, CA (US)

(73) Assignee: Tyco Electronics Corporation, Middletown, PA (US)

( * ) Notice: Subject to any disclaimer, the term of this patent is extended or adjusted under 35 U.S.C. 154(b) by 143 days.

(21) Appl. No.: 11/014,433

(22) Filed: Dec. 16, 2004

(65) Prior Publication Data

US 2006/0133016 A1 Jun. 22, 2006

(51) Int. Cl.
*G06F 1/16* (2006.01)
(52) U.S. Cl. ...................... 361/681; 248/917
(58) Field of Classification Search ............... 361/681, 361/682; 248/917–924; 312/223.1, 223.2
See application file for complete search history.

(56) References Cited

U.S. PATENT DOCUMENTS

| 7,061,753 | B2 * | 6/2006 | Michoux et al. ............ 361/681 |
| 2003/0090864 | A1 * | 5/2003 | Kuo ........................... 361/681 |
| 2003/0227739 | A1 * | 12/2003 | Kim et al. .................. 361/681 |
| 2004/0232298 | A1 * | 11/2004 | Bremmon et al. .......... 248/917 |
| 2005/0127253 | A1 * | 6/2005 | Kim ........................... 248/918 |

* cited by examiner

*Primary Examiner*—Lisa Lea-Edmonds

(57) ABSTRACT

A mount plate for mounting a display system to a monitor support surface. The display system has a wedge member. The mount plate has a bottom wall comprising top and bottom faces. The bottom face of the bottom wall is configured to be secured to the monitor support surface. A ramp member is joined to the bottom wall. The ramp member has an opening configured to slidingly receive the wedge member of the display system. The ramp member is configured to engage the wedge member to secure the display system to the monitor support surface.

20 Claims, 6 Drawing Sheets

APPARATUS FOR MOUNTING A DISPLAY SYSTEM TO A FRONT SIDE OF A SURFACE

BACKGROUND OF THE INVENTION

This invention relates generally to apparatus used to mount a display system to a surface, and more particularly, to mounting apparatus which is mountable to a front side of a surface without having to access a back side of the surface.

Display systems are used in many different public use applications. Point of sale (POS) display systems, such as in a department store for completing sales transactions, may provide a touch screen on the monitor for entering sale data. Point of information (POI) display systems are used to provide information, such as an electronic directory in an office building, airport check-in, maps, or other information. For POS, the display system is often mounted on a table or counter, while a POI may be mounted to a wall.

Several considerations are made concerning display systems available for public use. It is desirable to securely mount the display system to a surface to prevent theft and to prevent the display system from moving even with vigorous use from multiple users. It is also highly desirable to have a display system which is attractive to users.

Some display systems are mounted to the surface by accessing the back side of the surface. However, it is often difficult, cumbersome, or even impossible to access the back side of the surface. For example, the table or desk top may not be accessible from underneath due to its construction or thickness. In the case of the wall, only the front or outer surface of the wall is available. Additionally, if the back side of a surface is visible, it is undesirable to mar the visible surface with fasteners attached to an item on the other side of the wall.

Previous display systems have been mounted by providing mounting holes in the outer cover of the stand through which a fastener is inserted. The holes may be left as is, leaving the fastener visible to the user and easily accessible and/or vandalized should one desire to remove the display system. The fastener is also unattractive and is often a different color than the outer cover. Alternatively, plastic plugs may be inserted or screwed into the holes in the cover. The plastic plugs are not permanently attached to the cover and thus may be easily removed and lost. As the plugs necessarily extend outward from the cover, the plugs become worn and disfigured over time. In addition, holes and plugs in the cover visibly mar the surface of the cover by breaking the line of the surface, providing a less attractive presentation to the user.

Therefore, a need exists for a mounting apparatus that allows for mounting a display system from the front side of a surface without sacrificing the security or attractiveness of the display system. Certain embodiments of the present invention are intended to meet these needs and other objectives that will become apparent from the description and drawings set forth below.

BRIEF DESCRIPTION OF THE INVENTION

In one embodiment, a mount plate for mounting a display system to a monitor support surface. The display system has a wedge member. The mount plate has a bottom wall comprising top and bottom faces. The bottom face of the bottom wall is configured to be secured to the monitor support surface. A ramp member is joined to the bottom wall. The ramp member has an opening configured to slidingly receive the wedge member of the display system. The ramp member is configured to engage the wedge member to secure the display system to the monitor support surface.

In another embodiment, a display system is configured to be mounted to a monitor support surface. A display monitor has a front face displaying information to a user. A monitor stand has a base portion configured to be secured to the monitor support surface. A support leg extends from the base portion and supports the display monitor. At least one of the base portion and the support leg has an open side exposing an interior cavity within the monitor stand. The open side is positioned on the monitor stand to face the user. A removable cover is attached to the monitor stand to cover the open side of at least one of the base portion and the support leg.

In another embodiment, an apparatus for mounting a display system to a front face of a surface without accessing a back face of the surface. A mount plate has a bottom wall configured to be secured to the front face of the surface. The ramp member is formed with the bottom wall of the mount plate and has a wedge shaped opening. A display system has a display monitor and a monitor stand. The monitor stand has a wedge member that is slidingly received by the wedge shaped opening. The ramp member is configured to engage the wedge member to secure the display system to the surface.

The foregoing summary, as well as the following detailed description of certain embodiments of the present invention, will be better understood when read in conjunction with the appended drawings. It should be understood that the present invention is not limited to the arrangements and instrumentality shown in the attached drawings.

DETAILED DESCRIPTION OF THE INVENTION

Figure 1:
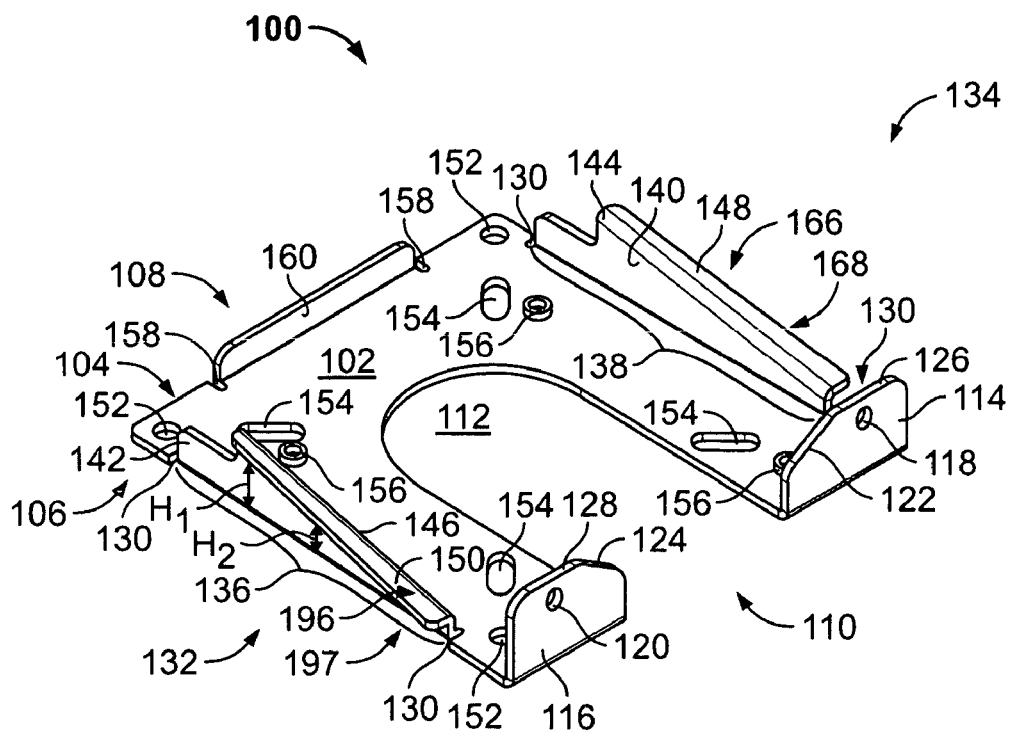
FIG. 1 illustrates a mount plate formed in accordance with an embodiment of the present invention.

FIG. 1 illustrates a mount plate 100 formed in accordance with an embodiment of the present invention. The mount plate 100 may be used to mount a display system 198 (FIG.

3) to a front side of a surface without accessing a back side of the surface. The mount plate 100 comprises a bottom wall 102 which has a top face 104 and a bottom face 106. The top face 104 is configured to face an inner portion of the display system 198, and the bottom face 106 is configured to rest against a surface. The bottom wall 102 comprises a cutout 112. The cutout 112 allows display system cables to pass through a hole in the surface, keeping the cables within an interior of the display system 198, and thus obscured from users. It should be understood that the mount plate 100 may be formed without a cutout 112, and that the cutout 112 may be a different shape and/or size while remaining within the scope of the invention.

The mount plate 100 may be stamped and formed from a single piece of material, and has a front end 108, a rear end 110, and sides 132 and 134. At the rear end 110, tabs 114 and 116 are bent upwards in the direction of the top face 104 and are substantially perpendicular with respect to the bottom wall 102. The tabs 114 and 116 each comprise a hole 118 and 120, respectively. Each of the tabs 114 and 116 may have a notch 122 and 124 in a top side 126 and 128, respectively, removing unneeded mass from the tabs 114 and 116.

The bottom wall 102 includes notches or shears 130 cut in the sides 132 and 134. Ramp members 136 and 138 are bent to project upward from the bottom wall 102 and away from the surface to which the mount plate 100 is secured. In the embodiment of FIG. 1, the ramp members 136 and 138 are formed along each of the sides 132 and 134. The ramp member 138 comprises a side wall 140 which is integral with and substantially perpendicular to the bottom wall 102. An intersection 144 forms a bend and lies between the side wall 140 and top flange 148. The top flange occupies a plane forming an acute angle with respect to the bottom wall 102. The top flange 148 has a top side 166 and a bottom side 168. The ramp member 136 is formed in a similar manner with respect to ramp member 138, however the ramp members 136 and 138 are bent and formed to face outwards from the bottom wall 102 and opposite with respect to each another. The ramp member 136 comprises a side wall 142 which is joined with, and substantially perpendicular to, the bottom wall 102. The ramp members 136 and 138 extend parallel to one another from the rear end 110 to the front end 108. An intersection 146 forms a bend and lies between the side wall 142 and top flange 150. The top flange 150 is oriented at an acute angle with respect to the bottom wall 102. The top flange 150 has a top side 196 and a bottom side 197.

Four holes 152 are formed in the bottom wall 102. One hole 152 is obscured by the tab 114. Fasteners may be extended through the holes 152, from the top face 104 towards the bottom face 106, to attach the mount plate 100 to a surface, such as a table or wall. It should be understood that more or less holes 152 and associated fasteners may be used. By way of example only, wood or metal screws may be used when mounting the mount plate 100 to a wood or metal table, respectively. Alternatively, lag, toggle, or molly bolts may be used when attaching the mount plate 100 to a wall. Therefore, the back side of a surface does not need to be accessed in order to install the mount plate 100.

In addition, four slots 154 and four threaded or tapped holes 156 are provided in the bottom wall 102 of the mount plate 100. One tapped hole 156 is obscured behind the tab 116. The slots 154 and tapped holes 156 are provided to allow flexibility in mounting the mount plate 100. Therefore, the mount plate 100 may also be installed by inserting screws from the back side of a surface into the tapped holes 156. The tabs 114 and 116 tabs are configured to be attached to the display system 198 to prevent disengagement of the wedge members 190 and 191 from ramp members 136 and 138 (FIG. 2), as discussed further below.

The bottom wall 102 includes notches or shears 158 cut in the front end 108. Tab 160 is bent upwards to form a plane substantially perpendicular to the bottom wall 102, providing strength to the mount plate 100.

Figure 2:
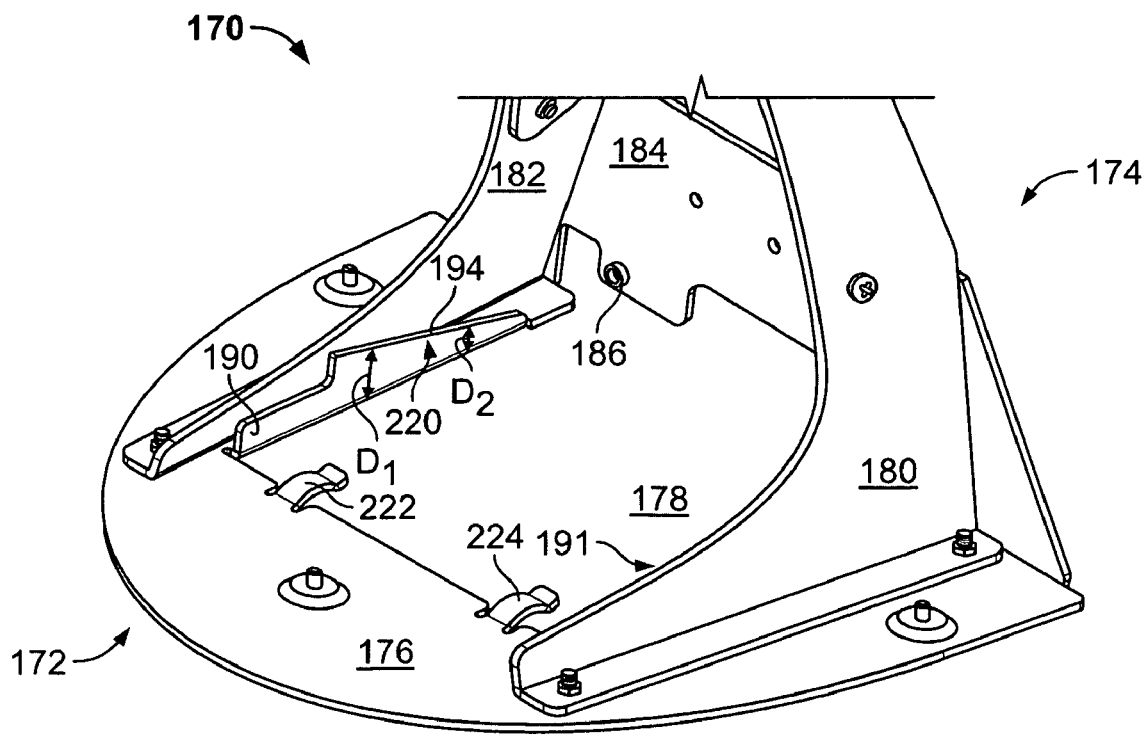
FIG. 2 illustrates a portion of a monitor stand which may be mounted with the mount plate in accordance with an embodiment of the present invention.

FIG. 2 illustrates a portion of a monitor stand 170 which may be mounted with the mount plate 100 in accordance with an embodiment of the present invention. The monitor stand 170 has a front end 172 and a rear end 174. A bottom plate 176 has a cut out region 178 which is open to the rear end 174. Support beams 180 and 182 attach to and project upward from the bottom plate 176 to support a display monitor 200 (FIG. 3) and associated hardware and electronics (not shown). A back plate 184 attaches to the bottom plate 176 and/or extends between the support beams 180 and 182, and is oriented substantially perpendicular with respect to the bottom plate 176. The back plate 184 has two threaded or tapped holes 186 and 188. The tapped hole 188 is obscured by support beam 180. One or more tabs 222 and 224 may be formed to extend into the cut out region 178. The tabs 222 and 224 provide stability if a user chooses not to attach the monitor stand 170 to the surface and when the monitor stand 170 is shipped.

The bottom plate 176 extends along a plane substantially parallel to a surface of a structure to which the mount plate 100 is secured. Wedge member 190 is joined to, and is bent and formed to occupy a plane substantially perpendicular to, the bottom plate 176. For example, the wedge member 190 may be formed integral with the bottom plate 176. A second wedge member 191 is bent and formed in the same manner as the wedge member 190, but is obscured in FIG. 2 by the support beam 180. The wedge member 190 has a top edge 194 which occupies a plane forming an acute angle with the plane of the bottom plate 176. The wedge member 190 also has an interior facing surface 220 which faces the cut out region 178. The support beams 180 and 182, bottom plate 176, back plate 184, and wedges 190 and 191 may be formed of die cast aluminum, magnesium, or other sturdy material. The wedges 190 and 191 are shaped similarly and operate in a similar manner, and thus the remaining related discussion of is primarily directed to wedge 190.

Figure 3:
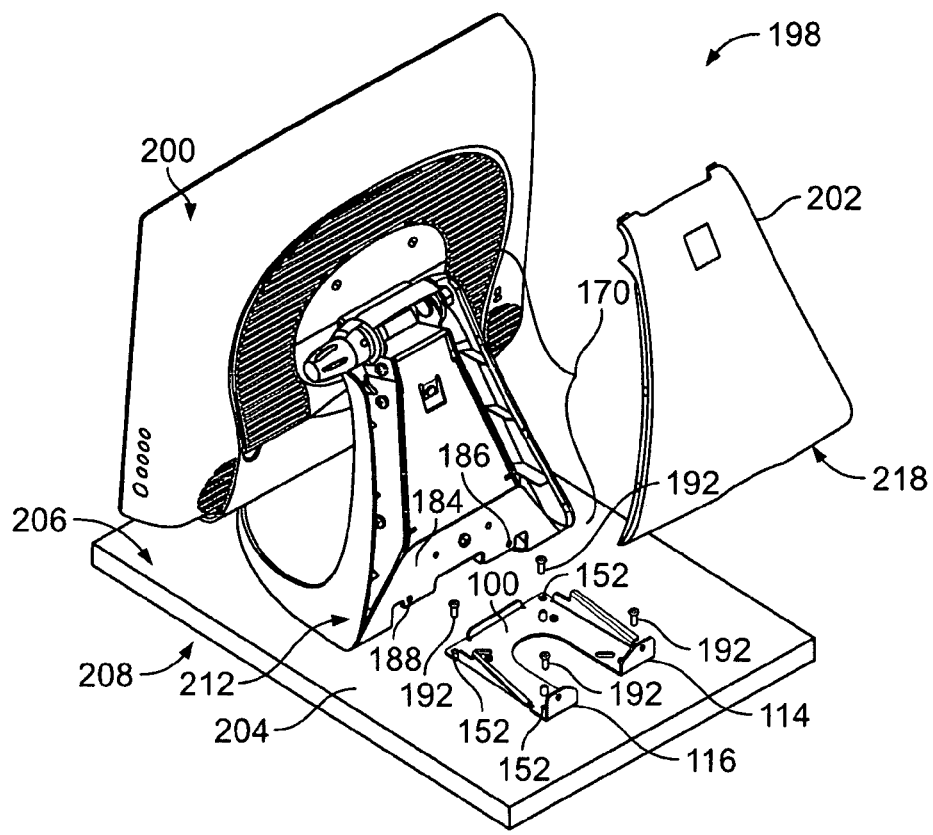
FIG. 3 illustrates a display system and a mount plate formed in accordance with an embodiment of the present invention.

FIG. 3 illustrates a display system 198 and a mount plate 100 formed in accordance with an embodiment of the present invention. The display system 198 comprises a display monitor 200 attached to the monitor stand 170. The display monitor 200 has a display (not shown) and may include an integrated personal computer (PC) within the display monitor 200. The display system 198 may also be referred to as having an integrated thin client or as being an all-in-one PC. The display may be a touch screen type accepting input from a user, such as a POS terminal which allows a user to select the type of transaction (e.g. debit or credit) and confirm the total price of a purchase.

A removable cover 202 is illustrated. The removable cover 202 provides a smooth surface with no marring caused by holes used to access fasteners which mount the display system 198 to a surface 204. The smooth surface of the removable cover 202 is attractive and easier to clean than a cover with holes or slots, and eliminates the need to maintain or replace plugs which may be used to cover the visible fasteners. The back plate 184 of the monitor stand 170 is illustrated with the tapped holes 186 and 188.

Alternatively, a cover which may not be designed to be easily removable (not shown) by a user may be installed instead of the removable cover 202. The cover may be provided with one or more small cutouts, notches, or holes along a bottom edge 218 (position indicated on the removable cover 202 for reference) which allows access to the holes 118 and 120 in the back tabs 114 and 116. The points of access along the bottom edge 218 are not obtrusive to the visual line of the cover.

The surface 204 has a front face 206 and a back face 208. The front face 206 may be the top of a table or the portion of a wall facing into a room, while the back face 208 may be the bottom of the table or the back side of a wall. As discussed previously, the back face 208 may not be accessible, it may not be desired to mar the surface of the back face 208, or the surface 204 may be thick so as to be difficult or impractical to attach fasteners through.

Fasteners 192 are illustrated above the holes 152 in the mount plate 100. The fasteners 192 are inserted through the holes 152 to attach the mount plate 100 to the front face 206 of the surface 204. Therefore, there is no need to access and/or mar the back face 208. Also, as the mount plate 100 is attached to the front face 206 of the surface 204, it may be easier to hold and securely install the mount plate 100 in a desired position when compared to installation from the back face 208 of the surface 204.

Figure 4:
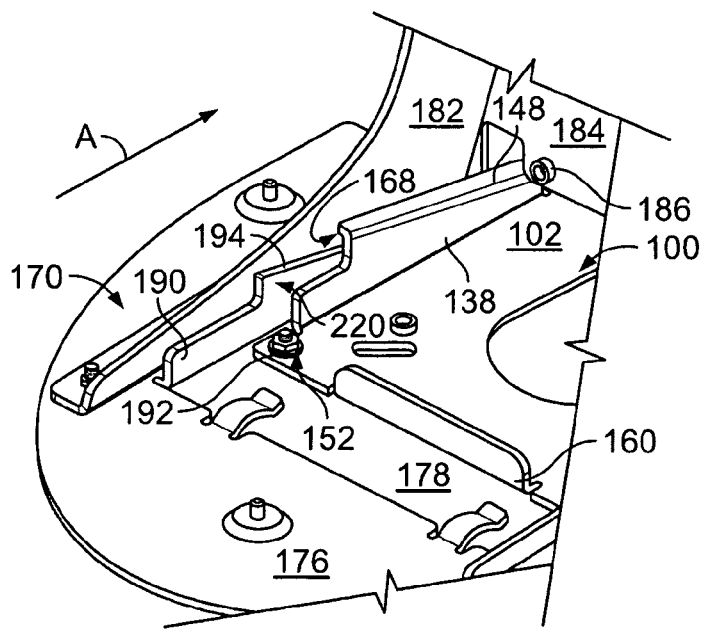
FIG. 4 illustrates a portion of the mount plate and a portion of the monitor stand formed in accordance with an embodiment of the present invention.

FIG. 4 illustrates a portion of the mount plate 100 and a portion of the monitor stand 170 formed in accordance with an embodiment of the present invention. The mount plate 100 has been mounted or attached to a surface, such as the surface 204 of FIG. 3, with the fasteners 192 through the holes 152. Not all of the fasteners 192 are shown in FIG. 3, but may be referenced as illustrated previously in FIGS. 1 and 3. Therefore, the mount plate 100 is securely fastened to the front face 206 of the surface 204 without having to access the back face 208 of the surface 204.

It should be understood that the ramp members 136 and 138 and the wedge members 190 and 191 may be formed in locations other than the locations indicated, such as within a center portion of the bottom wall 102 and the monitor stand 170. Additionally, a single ramp member and wedge member may be utilized.

The monitor stand 170 is moved in the direction of arrow A when installing the monitor stand 170 on the mount plate 100. The mount plate 100 occupies a portion of the cut out region 178 of the bottom plate 176. Therefore, the bottom wall 102 of the mount plate 100 fits between the wedge members 190 and 191 of the monitor stand 170. The opposed ramp members 136 and 138 slide along interior facing surfaces of the wedges 190 and 191, such as interior facing surface 220 of the wedge 190. The wedge member 190 is slidingly received underneath the bottom surface 168 of the top flange 148 of the ramp member 138. As the monitor stand 170 is moved further in the direction of arrow A, the top edge 194 of the wedge member 190 contacts the bottom surface 168 of the top flange 148 of the ramp member 138. The ramp member 138 provides a downward, or stopping, force to the wedge member 190, and thus provides stability to the monitor 200 and monitor stand 170.

Returning to FIG. 1 and the ramp member 136, $H_1$ and $H_2$ represent height measurements from the surface, such as surface 204 in FIG. 4, to the bottom surface 197 of the top flange 150. When forming the ramp member 136, $H_1$ is greater than $H_2$. In other words, the height is gradually decreased and becomes progressively smaller when moving from the front end 108 toward the rear end 110. Therefore, a wedge shaped opening is provided beneath the bottom surface 197 of the top flange 150. Returning to FIG. 2 and the wedge member 190, $D_1$ and $D_2$ represent height measurements from the top edge 194 of the wedge member 190 to the surface 204. Therefore, the wedge member 190 is formed such that the D measurements along the wedge member 190 from the top edge 194 to the surface 204 are proportional and slightly less with respect to the H measurements (of the ramp member 136) to allow the wedge member 190 to fit underneath the ramp member 136. The wedge member 190 is configured to contact the ramp member 136 once the wedge member 190 has been inserted a desired amount of distance under the ramp member 136, providing a retention force between the ramp member 136 and the wedge member 190 and holding the display system 198 securely to the surface 204. It is desirable to configure the wedge members 190 and 191 and the ramp members 136 and 138 to provide maximum support between the mount plate 100 and the monitor stand 170, while minimizing the travel distance (of the monitor stand 170 in the direction of arrow A) necessary to secure.

It should be understood that the relationship between the H and D measurements, and thus the relationship between the ramp member 136 and the wedge member 190 is more important than the actual height of the D and H measurements, which may be determined by the amount of clearance available within the monitor stand 170 and the like. Therefore, dimensions for D and H vary with respect to the height of the monitor stand 170.

Figure 5:
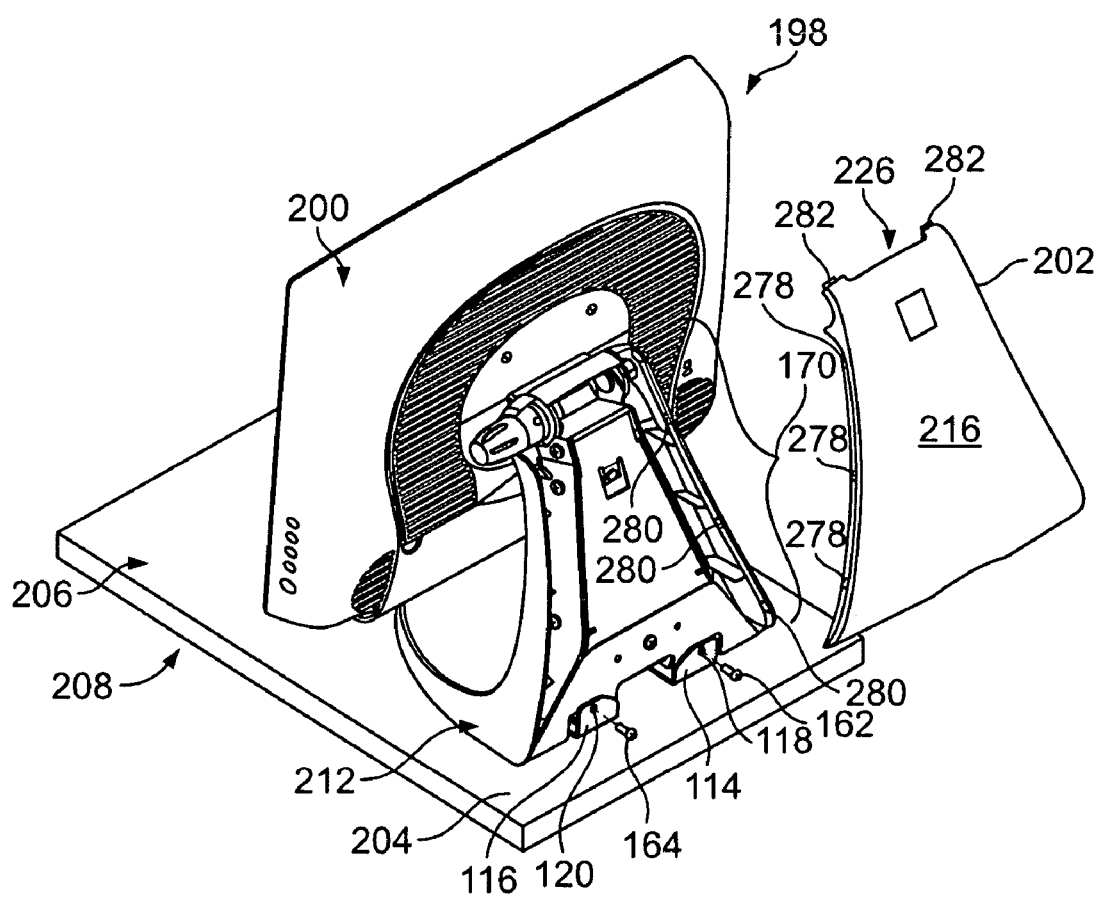
FIG. 5 illustrates the display system installed with the mount plate in accordance with an embodiment of the present invention.

FIG. 5 illustrates the display system 198 installed with the mount plate 100 in accordance with an embodiment of the present invention. Fasteners 162 and 164 are inserted through the holes 118 and 120 in the tabs 114 and 116, respectively, of the mount plate 100. The fasteners 162 and 164 screw into the tapped holes 186 and 188 in the back plate 184 of the monitor stand 170 (FIG. 3).

By way of example only, a user may first install the mount plate 100 on the desired surface 204 using fasteners 192 through the holes 152. The user may then slide the monitor stand 170 along the mount plate 100, such as in direction A of FIG. 4, slidably engaging the wedge member 190 underneath the ramp member 138. The wedge member 191 (not shown) on the opposite side of the monitor stand 170 simultaneously slidably engages the ramp member 136. When the wedges 190 and 191 and ramp members 136 and 138 are fully seated or engaged with one another, a stopping force is met. The user may then insert the fasteners 162 and 164 through the holes 118 and 120 in the tabs 114 and 116, respectively, of the mount plate 100. The user then inserts and tightens the fasteners 162 and 164 in the tapped holes 186 and 188 of the back plate 184 of the monitor stand 170. A stopping force is exerted between the wedge members 190 and 191 and the ramp members 136 and 138 as the monitor stand 170 becomes securely mounted to the mount plate 100. A slight gap may be left between an inner surface of the tabs 114 and 116 and the outer surface of the back plate 184. The gap between the tabs 114 and 116 and the back plate 184 allows for a degree of tolerance when manufacturing the ramp members 136 and 138 and wedges 190 and 191.

Figure 6:
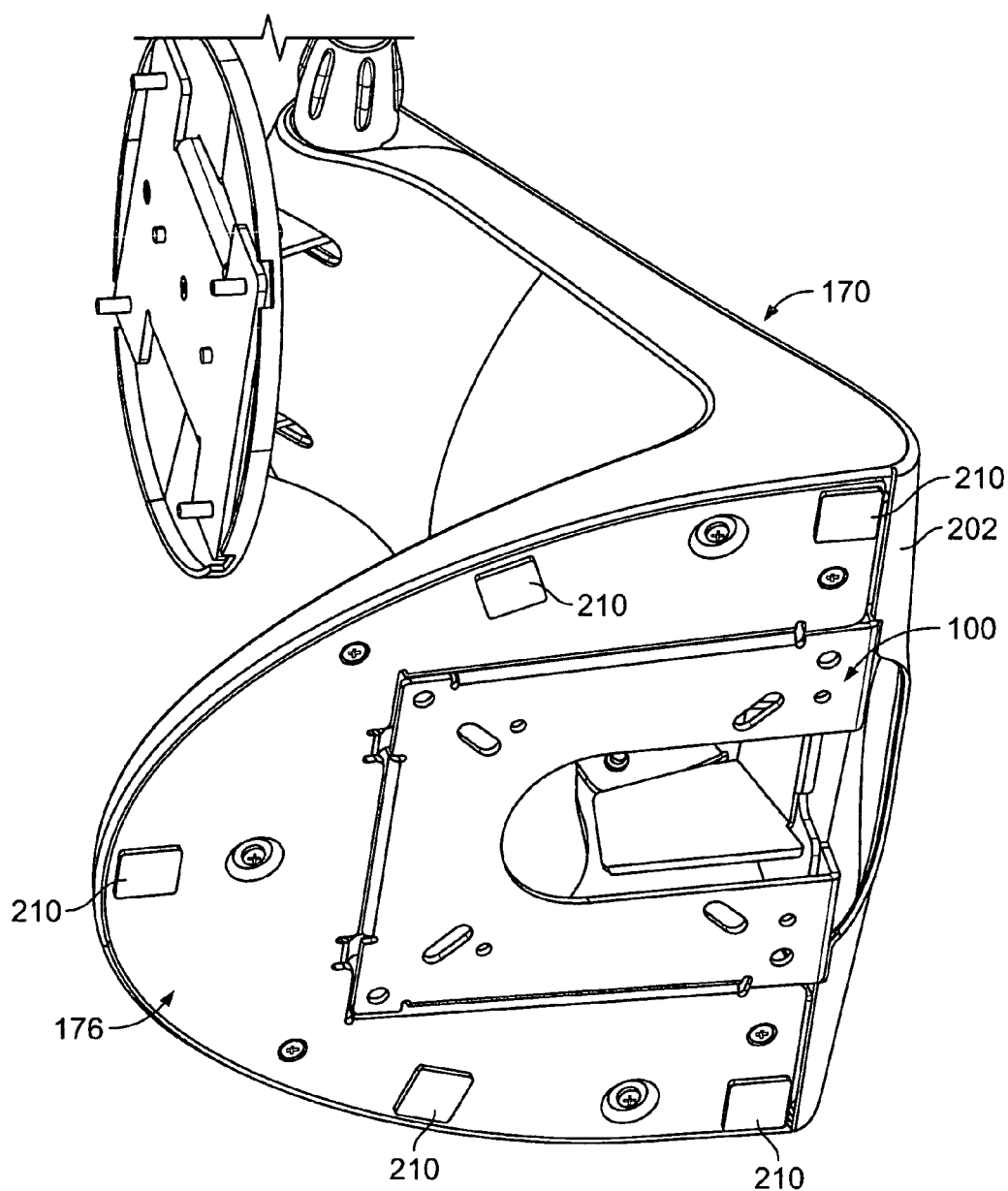
FIG. 6 illustrates a bottom view of the monitor stand formed in accordance with an embodiment of the present invention.

FIG. 6 illustrates a bottom view of the monitor stand 170 formed in accordance with an embodiment of the present invention. As illustrated, the mount plate 100 is attached to the monitor stand 170. Feet 210, or compressible members, are attached to the bottom side of the bottom plate 176 and provide contact with the surface 204. As illustrated in FIG. 6, there may be five feet 210 spaced approximately equidistant with respect to one another along the perimeter of the bottom plate 176. However, it should be understood that a different number of feet 210 may to used, such as three feet 210 or seven feet 210, and the feet 210 may be placed in different locations than illustrated in FIG. 6. Also, the feet 210 may comprise other suitable shapes and sizes, such as a strip of material placed along each side of the bottom plate 176.

The feet 210 may be formed of a rubberized or other compressible material. Therefore, as the fasteners 162 and 164 are tightened in the holes 186 and 188 of the monitor stand 170, a retaining force is exerted on the surface 204. Therefore, the feet 210 grip the surface 204. As the feet 210 are compressible, the feet 210 provide increased stability to the display system 198 when installed on the surface 204, and also compensate for small irregularities in the front face 206 of the surface 204.

Returning to FIG. 5, the monitor stand 170 also has a front cover 212 which may be formed of molded plastic or other sturdy and lightweight material. After the monitor stand 170 and mount plate 100 have been securely attached to the surface 204, the removable cover 202 is installed on the monitor stand 170. Protrusions 282 along a top edge 226 and protrusions 278 along each side edge of the removable cover 202 (protrusions 278 are illustrated on one side edge) are snappingly received by corresponding grooves or slots 280 formed in back side and top edges of the front cover 212 (slots 280 are illustrated on one back side edge.) The front cover 212 and removable cover 202 provide a cosmetic and protective cover for the metal components of the monitor stand 170 and the internal electronics needed to support, drive and power the display monitor 230, as well as any integrated PC. The removable cover 202 also provides a smooth outer surface 216 which covers and obscures the mount plate 100 and associated fasteners. Therefore, no unattractive fasteners are seen through or on the outer surface 216 of the removable cover 202, and the display system 198 is securely attached to the surface 204 without having to access or mar the back face 208 of the surface 204.

Figure 7:
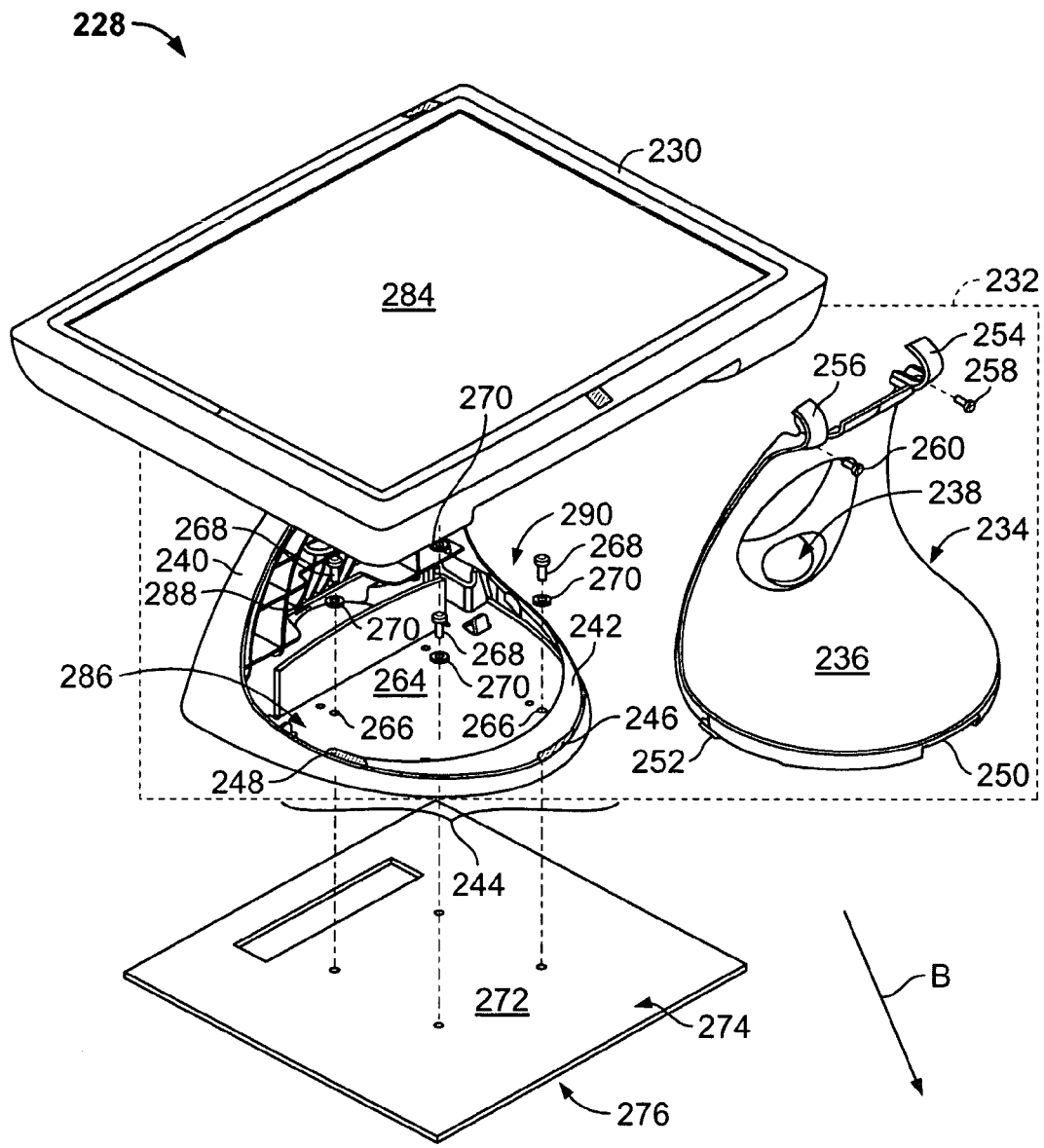
FIG. 7 illustrates an alternative display system being mountable to a front side of a surface in accordance with an embodiment of the present invention.

FIG. 7 illustrates an alternative display system 228 being mountable to a front side of a display support surface 272 in accordance with an embodiment of the present invention. The display system 228 comprises a display monitor 230 and monitor stand 232. The display monitor 230 has a front face 284 for displaying information to a user. The front face 284 may also be a touch screen which both displays information to and accepts input from the user. The monitor stand 232 includes a base portion 286 configured to be secured to the monitor support surface 272. The monitor stand 232 also includes a support leg 288 extending upward from the base portion 286 in a direction away from the monitor support surface 272. The base portion 286 and support leg 288 have an open side that exposes an interior cavity 290 within the monitor stand 232. The open side is positioned on the monitor stand 232 to face the user.

The monitor stand 232 has a removable cover 234, which in the embodiment shown is a front cover of the monitor stand 232. It should be understood that the monitor stand 232 may be designed such that the removable cover 234 may be a back cover. The removable cover 234 is attached to the monitor stand 232 to cover the open side of the base portion 286 and the support leg 288. When the removable cover 234 is removed, the open side provides access to the cavity 290 within the monitor stand 232 proximate the front face 284 of the display monitor 230. The removable cover 234 comprises a smooth outer surface 236 which does not provide access to mounting hardware, such as with the prior art previously described. The outer surface 236 comprises an unbroken line. The removable cover 234 may have a hole 238 for monitor cables to pass through. The removable cover 234 may be formed of molded plastic or other lightweight material.

The monitor stand 232 may have a back cover 240 joined to the support leg 288 and the base portion 286, all of which may be formed of metal, such as magnesium or aluminum. The back cover 240 and the removable cover 236 provide a cosmetic and protective covering for the support leg 288, base portion 286, mounting hardware, and internal electronics needed to support, drive and power the display monitor 230.

A bottom wall 264 of the base portion 286 has four holes 266 (two holes 266 are obscured). Four fasteners 268 (one fastener is obscured) may each be used with a washer 270. The fasteners 268 are extended through the holes 266 in the bottom wall 264 and into a front face 274 of the display support surface 272. As stated previously, the display support surface 272 may be a table or a wall, for example. There is no need to access a back face 276 of the display support surface 272. The fasteners 268 may be wood or metal screws or a molly or lag bolt appropriate to the type of display support surface 272 being used.

The back cover 240 includes a lip 242 extending upwards and inwards towards the display monitor 230 from a front portion 244. The lip 242 rests flush against an inner surface of the removable cover 234 when the removable cover 234 is installed on the monitor stand 232. One or more grooves or slots 246 and 248 may be provided in the front portion 244 of the back cover 240. The slots 246 and 248 accept protrusions 250 and 252, respectively, of the removable cover 234. For example, when installing the removable cover 234, the removable cover 234 may be tipped at an angle, such as in the direction of arrow B, allowing the protrusion 250 to slide into slot 246 and under the front portion 244 of the back cover 240. As the removable cover 234 is tipped towards the back cover 240, the protrusion 252 is accepted by the slot 248. The protrusions 250 and 252 provide stability and help to hold the removable cover 234 in place.

Curved portions 254 and 256 surround a hinge mechanism (not shown) which allows the monitor 230 to be tipped upwards and downwards. The curved portions 254 and 256 rest against correspondingly shaped portions (not shown) of the back cover 240 and are attached to the back cover 240 and/or support leg 288 by way of fasteners 258 and 260 which are extended through holes (not shown) in the curved portions 254 and 256, respectively.

When the removable cover 234 is installed, the mounting hardware, such as the fasteners 268 attaching the monitor stand 232 to the surface 272, is not visible. Therefore a smooth surface is represented without unsightly marring by holes, plugs, or other obstructions.

Figure 8:
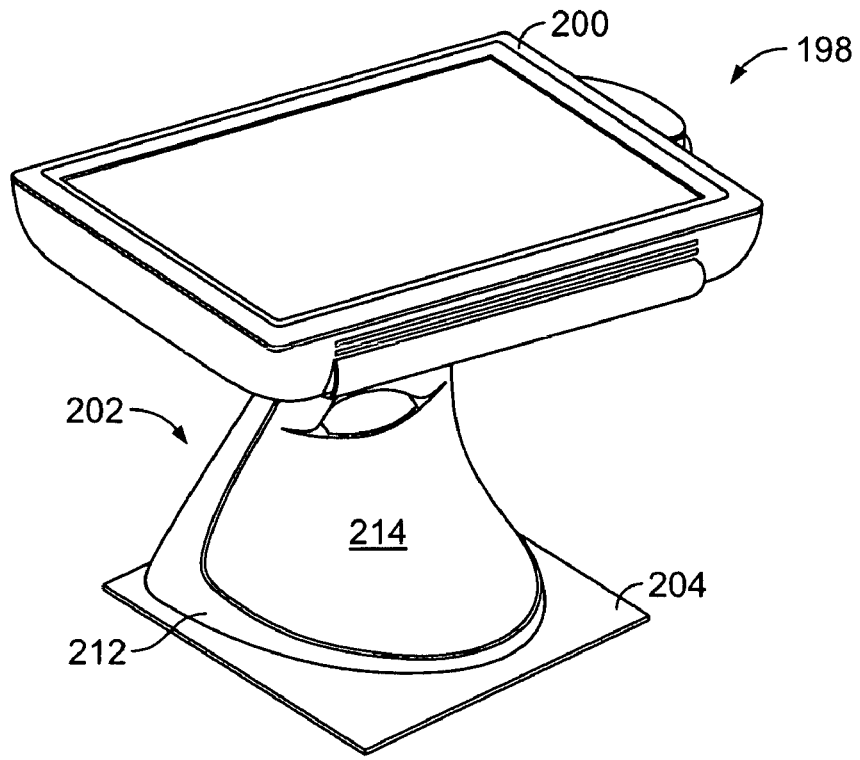
FIG. 8 illustrates the display system of FIG. 3 mounted to the surface in accordance with an embodiment of the present invention.

FIG. 8 illustrates the display system 198 of FIG. 3 mounted to the surface 204 in accordance with an embodiment of the present invention. FIG. 8 shows a front view, illustrating the front cover 212. Therefore, the removable cover 202 is not visible. The front cover 212 has a smooth outer surface 214 as described previously, which does not have any mar or break to allow a fastener to be inserted through to the surface 204.

Figure 9:
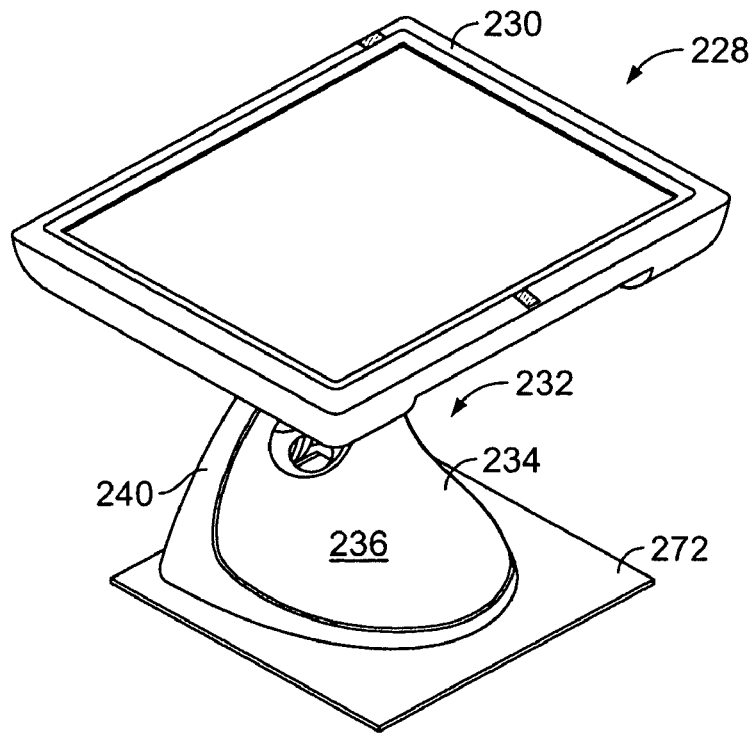
FIG. 9 illustrates the display system of FIG. 7 mounted to the surface in accordance with an embodiment of the present invention.

FIG. 9 illustrates the display system 228 of FIG. 7 mounted to the surface 272 in accordance with an embodiment of the present invention. FIG. 9 illustrates the removable cover 234 installed on the monitor stand 232. The outer surface 236 of the removable cover 234 is smooth, as was described previously and does not provide access for a fastener to be inserted through the removable cover 236.

Therefore, the display systems 198 and 228 may be mounted to the surfaces 204 and 272 without having to access the back side of the surfaces 204 and 272. Further-more, apparatus has been described which allows the display systems 198 and 228 to be mounted to the surfaces 204 and 272 either by way of a separate mount plate 100 or the bottom wall 264 which comprises part of the base portion 286 within the display system 228. Also, there is no unsightly marring of the outer surface of the monitor stand cover to allow for fasteners to be inserted. This eliminates the need for additional plugs which are often used to cover the head of the fastener.

While the invention has been described in terms of various specific embodiments, those skilled in the art will recognize that the invention can be practiced with modification within the spirit and scope of the claims.

What is claimed is:

1. A mount plate for mounting a display system to a monitor support surface, the display system having a wedge member, said mount plate comprising:
    a bottom wall comprising top and bottom faces, said bottom face of said bottom wall being configured to be secured to the monitor support surface; and
    a ramp member joined to said bottom wall, said ramp member having an opening configured to slidingly receive the wedge member of the display system, said ramp member being configured to engage the wedge member to secure the display system to the monitor support surface.

2. The mount plate of claim 1, further comprising tabs formed integral with said bottom wall, said tabs being oriented perpendicular to said bottom wall, said tabs being configured to be attached to the display system to prevent disengagement of the wedge member from said ramp member.

3. The mount plate of claim 1, said ramp member further comprising first and second ramp members formed integral with said bottom wall, said first and second ramp members being positioned on opposite sides of said mount plate, said first and second ramp members slidingly receiving corresponding wedge members of the display system.

4. The mount plate of claim 1, said ramp member further comprising a side portion and a top flange formed integral with one another, said top flange extending along a plane forming an acute angle with respect to said bottom wall, said top flange engaging the wedge member to secure the display system to the support surface.

5. The mount plate of claim 1, said ramp member further comprising a top flange extending along a plane that forms an acute angle with respect to a plane along which said bottom wall extends, said top flange having a height that progressively decreases when moving from one end of said ramp member to an opposite end of said ramp member.

6. The mount plate of claim 1, said ramp member further comprising:
    a side portion being joined with said bottom wall, said side portion being substantially perpendicular with respect to said bottom wall; and
    a top flange being joined with said side portion, said top flange forming an acute angle with respect to said bottom wall, said top flange having a height measurement between a bottom wall of said top flange and the monitor support surface, said height measurement being progressively smaller when moving from one end of said ramp member to an opposite end of said ramp member.

7. The mount plate of claim 1, said ramp member further comprising a top flange oriented at an acute angle with respect to said bottom wall, said top flange exerting a stopping force on the wedge member.

8. The mount plate of claim 1, said top flange exerting a stopping force on the wedge member when the display system is fully seated with said mount plate.

9. The mount plate of claim 1, further comprising a tab extending from said bottom wall and being attachable to the display system.

10. A display system configured to be mounted to a monitor support surface, said display system comprising:
    a display monitor having a front face displaying information to a user;
    a monitor stand comprising a base portion configured to be secured to a monitor support surface and a support leg extending from said base portion, said support leg being configured to support said display monitor, at least said support leg having an open side exposing an interior cavity within said monitor stand and allowing access to mounting hardware for mounting to the monitor support surface, said open side being positioned on said monitor stand to face the user; and
    a removable cover attached to the monitor stand to cover said open side of said at least one of said base portion and said support leg.

11. The display system of claim 10, said base portion including a bottom wall configured to be attachable to the monitor support surface, said bottom wall being exposed through said open side when said cover is removed.

12. The display system of claim 10, wherein said open side and said cavity is in both of said base portion and said support leg, said cover providing access to said cavity when said cover is removed.

13. The display system of claim 10, said cover further comprising an outer surface having an unbroken line.

14. The display system of claim 10, further comprising a fastener for fastening said monitor stand to the monitor support surface, said fastener extending from said base portion into the monitor support surface.

15. An apparatus for mounting a display system to a front face of a surface without accessing a back face of the surface, comprising:
    a mount plate comprising:
        a bottom wall being configured to be secured to the front face of the surface;
        a ramp member being formed with said bottom wall, said ramp member having a wedge shaped opening; and
    a display system comprising a display monitor and a monitor stand, said monitor stand comprising a wedge member being slidingly received by said wedge shaped opening, said ramp member being configure to engage said wedge member to secure the display system to the surface.

16. The apparatus of claim 15, further comprising:
    said mount plate further comprising a tab extending from said bottom wall, said tab being attachable to said monitor stand; and
    a cover for concealing said monitor stand, said cover allowing access to said tab for securing said tab to said monitor stand.

17. The apparatus of claim 15, further comprising a removable cover for concealing said monitor stand and said mount plate from view, said removable cover comprising an unmarred outer surface.

18. The apparatus of claim 15, said mount plate further comprising a tab extending from said bottom wall, said tab being attachable to said monitor stand to secure said ramp member and said wedge member to one another.

19. The apparatus of claim 15, further comprising said ramp member exerting a retaining force on said wedge member when said wedge member is inserted into said wedge shaped opening, said retaining force securing said display system to the surface.

20. The apparatus of claim 15, further comprising:

said monitor stand further comprising a bottom plate configured to face the front face of the surface; and a compressible member configured to attach to said bottom plate, said compressible member exerting a retaining force on the surface.

\* \* \* \* \*